J. R. CAYNOR.
SHOCK ABSORBER.
APPLICATION FILED MAR. 25, 1920.
1,363,309.
Patented Dec. 28, 1920.
2 SHEETS—SHEET 1.
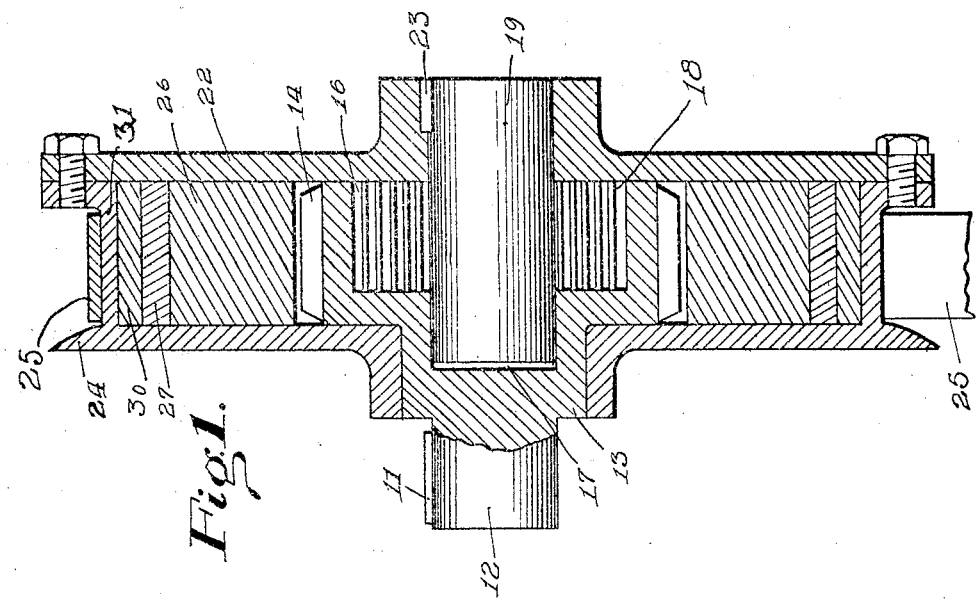
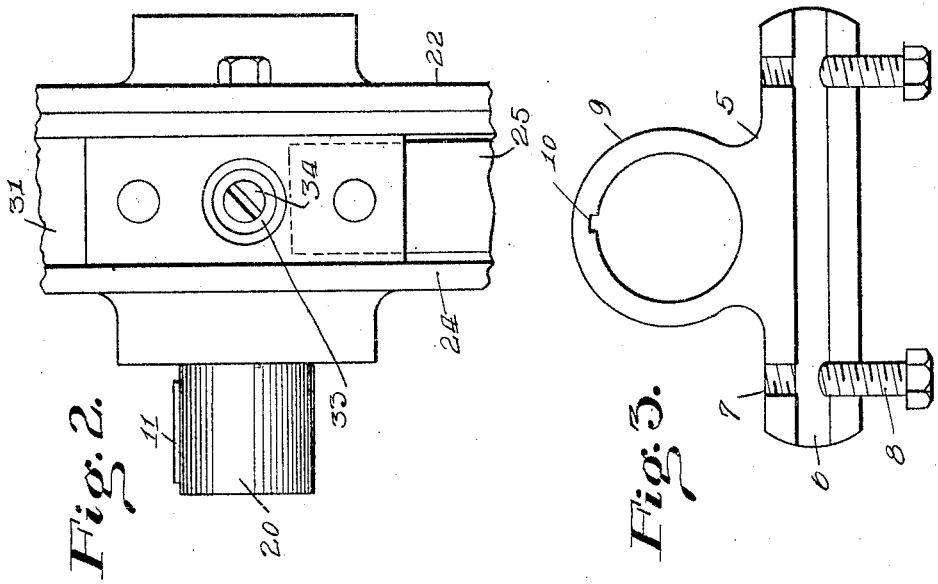
Inventor
J. R. Caynor.
Witness
By C. A. Snow & Co.
Attorneys

UNITED STATES PATENT OFFICE.

JULIUS R. CAYNOR, OF GOLDFIELD, NEVADA.

SHOCK-ABSORBER.

1,363,309.    Specification of Letters Patent.    Patented Dec. 28, 1920.

Application filed March 25, 1920. Serial No. 368,809.

*To all whom it may concern:*

Be it known that I, JULIUS R. CAYNOR, a citizen of the United States, residing at Goldfield, in the county of Esmeralda and State of Nevada, have invented a new and useful Shock-Absorber, of which the following is a specification.

This invention has reference to equalizers, and more particularly to equalizers employed in connection with motor vehicles for compensating for the recoil of the usual spring devices, when the motor vehicle to which the device is applied, meets with an obstruction.

The primary object of the invention is to provide a device of this character which will in operation, be disposed between the running gear and chassis of the motor vehicle to restrict movement of the running gear with relation to the chassis.

A further object of the invention is to provide means forming a part of the shock equalizer, to regulate the tension of the spring forming a part of the structure, thereby permitting the device to be efficiently employed in connection with vehicles of various designs, and weights.

A further object of the invention is to provide a device of this character so constructed that the same may be readily and easily applied to the usual automobile constructions now in use, thus eliminating the necessity of changing the construction in the application of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a transverse sectional view through a shock absorber constructed in accordance with the present invention.

Fig. 2 illustrates a fragmental plan view of the same.

Fig. 3 illustrates a side elevational view of the bracket employed for attaching the movement element of the absorber to the vehicle.

Figure 4:
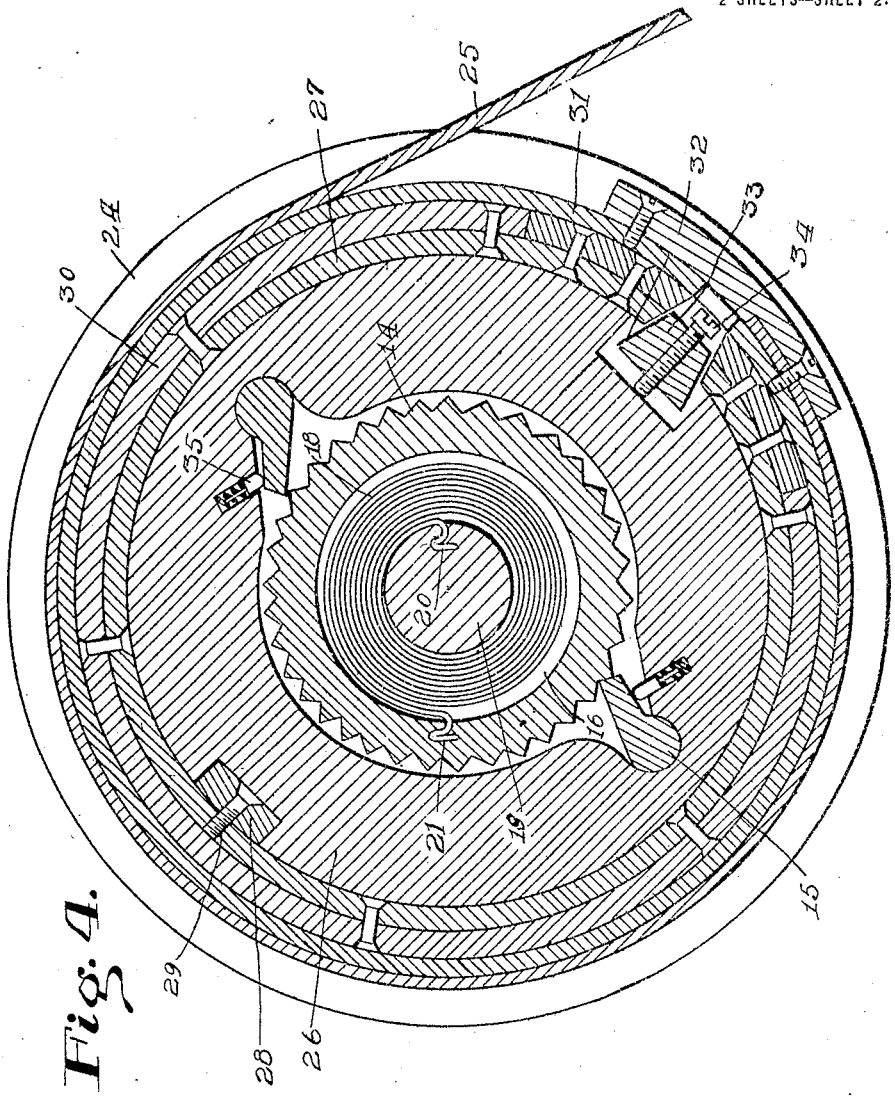
Fig. 4 illustrates a longitudinal sectional view through the device, illustrating the tensioning means.

Referring to the drawings in detail, the reference character 5 designates the bracket which is employed for securing the stationary element of the equalizer to the vehicle, and this bracket comprises a base provided with a longitudinal groove 6 of a construction to permit the bracket to be fitted over one of the side rails of the chassis of an automobile, the base being provided with registering openings 7, which are threaded to accommodate the securing bolts 8 for rigidly securing the bracket to the chassis.

The collar 9 also forms a part of the bracket, and is provided with a key-way 10 adapted to accommodate the integral key 11 carried by the shaft 12, so that when the shaft 12 is positioned within the collar 9 of the bracket, the key-way will prevent rotary movement of the stationary element or hub 13 of the shock-absorber, for purposes to be hereinafter more fully described.

This hub 13 is provided with the teeth 14 formed exteriorly thereof, which teeth coöperate with the pawls 15 carried by the movable element of the shock absorber to permit the tensioning member of the movable element to remain stationary when the movable element is moved in one direction, but to cause the movable element to rotate the tensioning member when the movable element moves in the opposite direction.

Formed in the hub 13, is a relatively large opening 16 and a shaft opening 17, the relatively large opening 16 being for the purpose of housing the coiled spring 18, which in turn embraces a portion of the shaft 19, and has one of its ends secured thereto as at 20, the opposite end of said coiled spring 18 being interlocked with the hub 13 as at 21. Thus it will be seen that upon movement of the shaft 19 in one direction, the coiled spring 18 is wound around the shaft 19 and put under tension, with the result that when the tension of the coiled spring 18 overcomes the tension which causes the rotary element to move or tension the spring, the entire device is rotated in the opposite direction, with the result that the shock absorber is brought to its normal position.

The rotating element comprises the drum 22, which is keyed to the shaft 19 as at 23, the drum being provided with the flanged periphery 24 to which is secured the flexible connecting member 25, which has, in operation, one of its ends connected to the axle of the vehicle, in any suitable manner.

Forming a part of the rotating element is an interior rotating member 26 circular in formation, and provided with the band 27 secured thereto by means of the block 28 and the screw 29. To this band 27, is secured the lining 30 of the usual fibrous material, which contacts with the band 31 secured to the main rotating element so that a binding action will be set up between the lining 30 and band 31, under certain conditions.

An opening 32 is formed in the periphery of the rotating member 26, and is adapted to accommodate the wedging member 33 which is provided with a threaded aperture to receive the adjusting screw 34 having one of its ends contacting with the base of the opening 32, so that movement of the adjusting screw will result in a relative movement of the wedging member 33 to cause the inclined walls thereof to contact with the inclined walls of the band 27 to cause the band to expand to more closely engage the band 31 to increase the friction between the rotating element and the inner rotating member 26.

The pawls 15, are shown as provided with enlarged heads fitted within suitable openings provided within the inner rotating member 26, and since these pawls are controlled by the spring pressed plungers 35 seated in suitable openings formed in the inner rotating member 26, it is obvious that the pawls are held into engagement with the teeth of the hub 13, at all times.

From the foregoing it will be apparent that by adjusting the screw 34, the frictional contact between bearing 30 and the band 31 may be increased or decreased, according to the size and weight of the motor vehicle, to which the device is to be applied. In connection with the foregoing it might be stated that if the device is to be applied to a relatively heavy truck, it will of course be necessary to expand the band 27 and the lining 30 to engage the band 31 with greater force than if the device were applied to a relatively light vehicle.

In the operation of the device, assuming that an automobile supplied with a shock absorber constructed in accordance with the invention were to meet with an obstruction, causing the chassis to move into close proximity to the axles thereof, the slack caused in the flexible connecting member 25 will be immediately taken up by the coiled spring 18 exerting a pressure on the inner rotating member 26 to cause the flexible connecting member 25 to be wound around the drum 22.

Upon reverse movement of the chassis, the tendency is to unwind the flexible connecting member 25 with the result that the spring 18 is again wound on the shaft 19, and the spring is again put under tension.

It follows, that when the spring 18 has reached a predetermined degree of tension, the inner rotating member 26, together with the band 27 and lining 30 remain stationary, and the drum 22 moves thereover, with the result that the friction caused between the lining 30 and band 31 retards the movement of the chassis to allow the same to gradually return to its normal position.

It will of course be understood that when a shock absorbing device constructed in accordance with the present invention is applied to a motor vehicle, the coiled spring 18 is manually tensioned to the desired degree, which degree of course would be determined by the design or weight of the motor vehicle to which the same is applied.

Having thus described the invention, what is claimed as new is:—

1. In combination with a motor vehicle, a shock absorbing device comprising a stationary hub, a drum embracing the hub, an inner movable member having frictional engagement with the drum, an expansible band supported by the inner movable member, said band having split ends, means positioned between the split ends for moving the band with respect to the inner movable member, and a flexible connecting member having connection with the band.

2. In combination with a motor vehicle, a shock absorbing device comprising a stationary hub, a drum embracing the hub, an inner movable member having frictional engagement with the drum, a band having split ends secured to the movable member, a wedging member disposed between the ends of the band, means having connection with the wedging member for moving the same between the split ends of the band to expand the same, and a flexible connecting member having connection with the band.

In testimony that I claim the foregoing as my own, I have hereto affixed my signature in the presence of two witnesses.

JULIUS R. CAYNOR.

Witnesses:
ARTHUR B. PARKER,
ORLO H. PARKER.